United States Patent
Cabrera et al.

(10) Patent No.: US 7,296,183 B2
(45) Date of Patent: Nov. 13, 2007

(54) SELECTABLE DATA FIELD CONSISTENCY CHECKING

(75) Inventors: Luis Felipe Cabrera, Bellevue, WA (US); George P. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 10/763,585

(22) Filed: Jan. 23, 2004

(65) Prior Publication Data

US 2005/0165860 A1 Jul. 28, 2005

(51) Int. Cl.
*G06F 11/00* (2006.01)

(52) U.S. Cl. ....................................................... 714/21

(58) Field of Classification Search ................. 714/15, 714/21, 39, 52
See application file for complete search history.

(56) References Cited

U.S. PATENT DOCUMENTS

| | | | | |
|---|---|---|---|---|
| 4,531,186 A | * | 7/1985 | Knapman | 707/5 |
| 4,789,986 A | * | 12/1988 | Koizumi et al. | 714/797 |
| 5,524,116 A | * | 6/1996 | Kalmanek et al. | 714/799 |
| 5,557,798 A | | 9/1996 | Skeen et al. | 395/650 |
| 5,848,238 A | * | 12/1998 | Shimomura et al. | 714/49 |
| 5,951,694 A | * | 9/1999 | Choquier et al. | 714/15 |
| 5,991,893 A | * | 11/1999 | Snider | 714/4 |
| 6,038,683 A | * | 3/2000 | Shimamura et al. | 714/11 |
| 6,167,485 A | * | 12/2000 | Kedem | 711/114 |
| 6,195,761 B1 | * | 2/2001 | Kedem | 714/6 |
| 6,295,541 B1 | * | 9/2001 | Bodnar et al. | 707/203 |
| 6,374,364 B1 | * | 4/2002 | McElroy et al. | 714/10 |
| 6,775,239 B1 | * | 8/2004 | Akita et al. | 370/248 |
| 6,928,578 B2 | * | 8/2005 | Archibald et al. | 714/6 |
| 6,934,717 B1 | * | 8/2005 | James | 707/104.1 |
| 6,973,571 B2 | * | 12/2005 | Lee et al. | 713/168 |
| 6,983,362 B1 | * | 1/2006 | Kidder et al. | 713/1 |
| 7,093,010 B2 | * | 8/2006 | Ostrup et al. | 709/223 |
| 2002/0169995 A1 | * | 11/2002 | Archibald et al. | 714/6 |
| 2003/0217133 A1 | * | 11/2003 | Ostrup et al. | 709/223 |
| 2004/0163029 A1 | * | 8/2004 | Foley et al. | 714/769 |
| 2005/0086562 A1 | * | 4/2005 | Demsky et al. | 714/100 |

OTHER PUBLICATIONS

Efficient Message Dispatch in Object-Oriented Systems Mayur Naik and Rejeev Kumar Mar. 2000 p. 49-58 ACM SIGPLAN.

(Continued)

*Primary Examiner*—Robert W. Beausoliel
*Assistant Examiner*—Elmira Mehrmanesh
(74) *Attorney, Agent, or Firm*—Workman Nydegger

(57) ABSTRACT

A system consistency management module that performs consistency checking on behalf of an instance. The module identifies data fields of state information corresponding to the instance that are to be subject to consistency checking. The instance may identify this data fields to the system module. The system module may also identify an event that will prompt the consistency checking. When the event occurs, the system module performs the consistency checking on the identified fields. If the system module detects an inconsistency, it may set the state information to reflect that the instance is operating in recovery mode. If the instance itself was to perform the consistency checking, the instance may inform the system module that an inconsistency has been detected. The system module then sets the state information for the instance to reflect that the instance is operating in recovery mode.

40 Claims, 3 Drawing Sheets

OTHER PUBLICATIONS

Cybernetics and Systems—Towards a Unified Messaging Environment Over the Internet Leonard Chong, Siu Cheung Hui and Chai Kiat Yeo 1999 p. 533-549.

ECOOP '95 Object-Oriented Programming Message Dispatch on Pipelined Processors Karel Driesen, Urs Holzle and Jan Vitek 1995 p. 252-282.

* cited by examiner

SELECTABLE DATA FIELD CONSISTENCY CHECKING

BACKGROUND OF THE INVENTION

1. The Field of the Invention

The present invention relates to computing technology; and more specifically, to mechanisms for performing consistency checking for selected data fields.

2. Background and Related Art

Computing technology has transformed the way we work and play. Computing systems now take a wide variety of forms including desktop computers, laptop computers, tablet PCs, Personal Digital Assistants (PDAs), household devices and the like. Currently, computing system technology has improved significantly. Numerous application or other software instances may run on a single computing system at the same time.

In order to operate properly, an instance often uses state information to allow the instance to properly interpret its current state. Each time the state information is transferred from one memory location to another (or between durable storage and a memory location), there is a possibility that a bit will switch from one binary value to another thereby corrupting the data that contains the bit. Furthermore, even if the data is not transferred, the passage of time alone introduces some risk of data corruption.

Data corruption can cause a significant adverse impact on the performance of the instance, and may even disable much of the functionality of the instance. In most cases, data corruption may cause the instance to cease operation altogether. To avoid this adverse impact on performance, some application instances have code that allows the instance to actively perform consistency checking to detect whether data corruption has occurred. Some instances even have recovery code that the instance executes when such a data corruption is detected. This is effective in detecting and recovering from data corruption. However, it requires that the instance have its own consistency checking and recovery code. Furthermore, some instances do not have such consistency checking code, and then are subject to the risks of data corruption. What would be advantageous are mechanisms for centralizing consistency checking to allow instances access to consistency checking of its state information without having dedicated code for performing the consistency checking.

Consistency checking is quite processor intensive depending on the amount of data to be subject to consistency checking. However, not all data fields have equal importance in terms of the risk and impact of data corruption. It may not be worthwhile to perform consistency checking on all of the state information for the instance. Accordingly, what would be advantageous are mechanisms for permitting the instance to designate which of the data fields in the state information are to be subject to consistency checking, and under what conditions.

BRIEF SUMMARY OF THE INVENTION

The foregoing problems with the prior state of the art are overcome by the principles of the present invention, which may be implemented in a computing system that includes one or more processors, and a system memory. The computing system is capable of using the one or more processors to instantiate in the system memory an instance of an application program and a system consistency management module.

In a first embodiment, the system consistency management module performs consistency checking on behalf of the instance. The system consistency management module identifies the instance state information data fields that are to be subject to consistency checking. The identified data fields may be less than all of the state information for the instance. The system consistency management module also identifies an event that will prompt the consistency checking. When the event occurs, the system consistency management module performs the consistency checking on the identified fields. The system consistency management module may identify the state information on its own, or may receive the identification through a function call from the instance. If the system consistency management module detects an inconsistency, then it may set the state information for the instance to reflect that the instance is operating in recovery mode.

In another embodiment, the instance itself performs consistency checking, but informs the system consistency management module through a function call that an inconsistency has been detected. The system consistency management module then sets the state information for the instance to reflect that the instance is operating in recovery mode.

Accordingly, the instance may have the system consistency management module identify the data fields that are to be checked and then have the system consistency management module perform the checking. The instance may elect to have a little more control by identifying the data fields to be checked to the system consistency management module and having the system consistency management module perform the checking. With even more control, the instance may perform the checking and just inform the system consistency management module when an inconsistency is detected. Therefore, the instance has wide ranging control over what component will perform consistency checking, when it will be performed, and what component will identify the data fields that will be subject to consistency checking.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
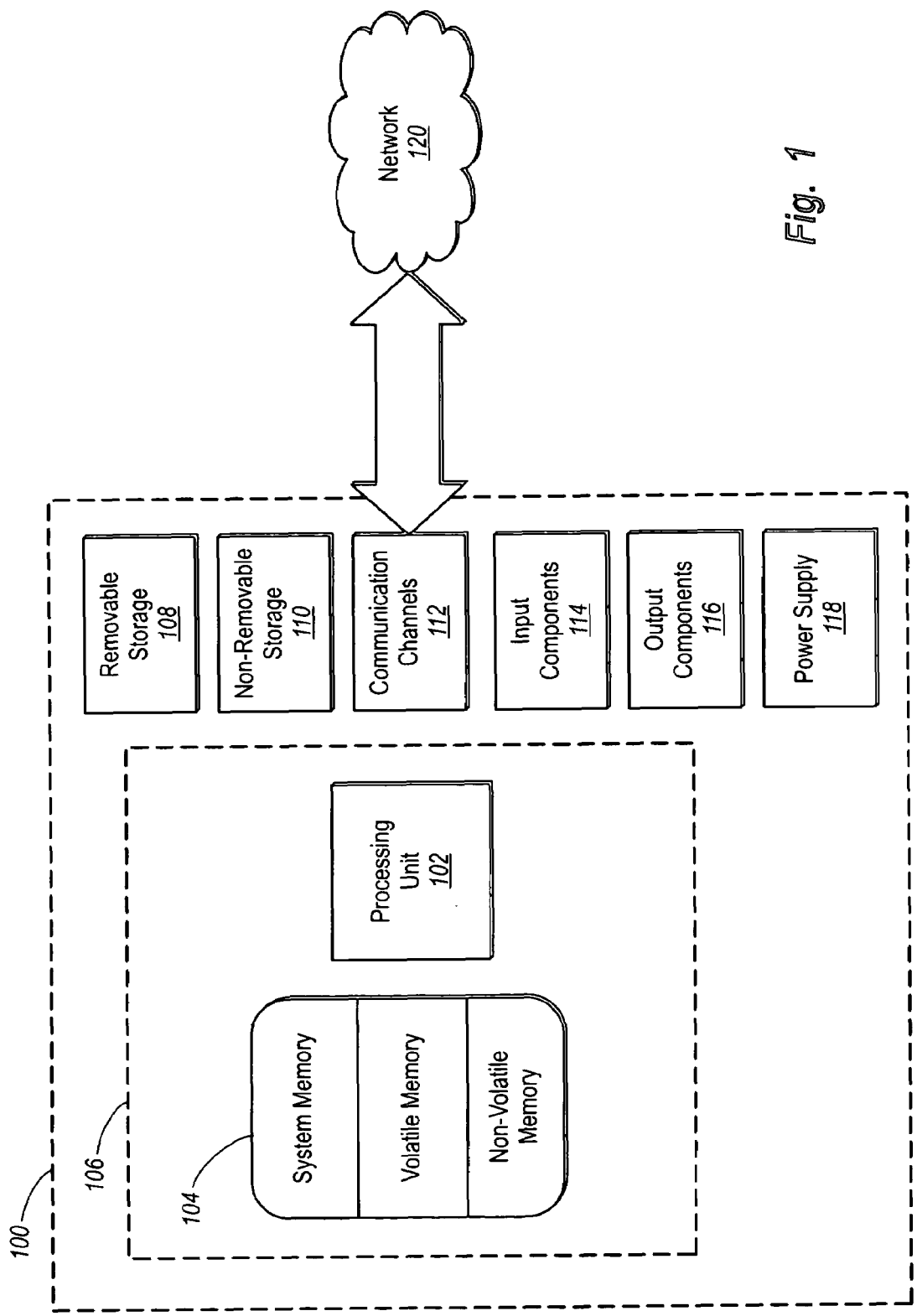
FIG. 1 illustrates a suitable computing system that may implement features of the present invention.

The principles of the present invention relate to mechanisms for allowing an instance to control whether or not to centralize consistency checking, when the consistency checking will be performed, and what data fields should be checked. Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also FIG. 1 shows a schematic diagram of an example computer architecture usable for these devices be implemented in hardware.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printers, etc., and rendering modules (often called "adapters") for driving them. The computing system 100 has a power supply 118. All these components are well known in the art and need not be discussed at length here.

Figure 2:
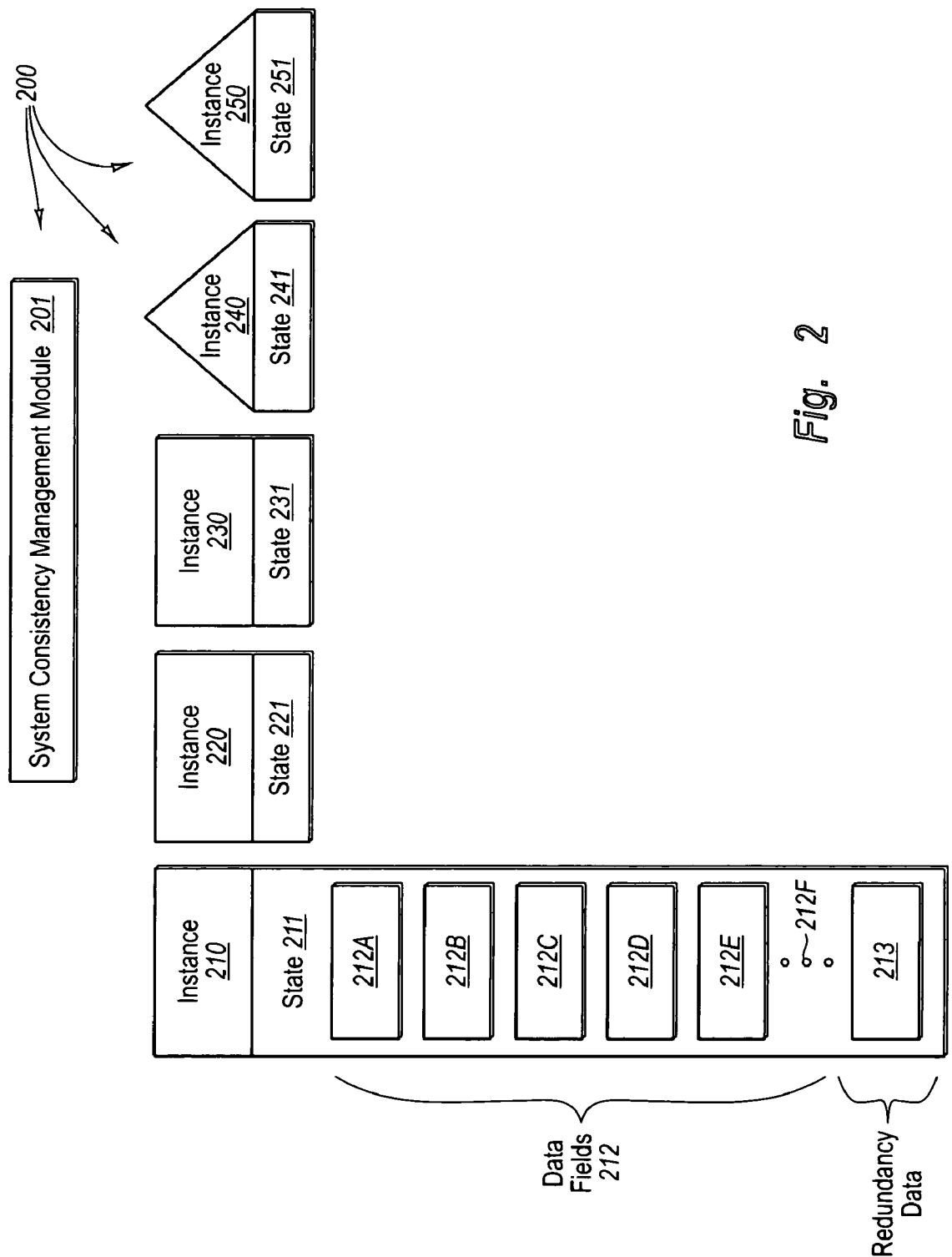
FIG. 2 illustrates various components that may be instantiated in system memory in accordance with the principles of the present invention.

FIG. 2 illustrates various components 200 that may be instantiated in system memory 104 in accordance with the principles of the present invention. The computing system may be engaged in multiple message transactions. A "message transaction" is defined as an exchange of messages with a particular client computing system, the exchange following a message exchange pattern. Accordingly, the system memory may include information for multiple transactions.

There is state information corresponding to each of the transactions. For example, state information 211, 221, 231, 241 and 251 each correspond to an individual message transaction. Accordingly, in the illustrated embodiment of FIG. 2, the computing system has state information for five different message transactions in system memory.

In addition to state information, the computing system needs appropriate executable code in order to properly manage a message transaction. In one embodiment referred to herein as the "per transaction instance embodiment", each message transaction may be governed by an instance of an application designed for the corresponding message (transaction type.

Suppose, in this example, that state information 211, 221 and 231 correspond to state information for different message transactions of the same message exchange pattern type. In the per transaction instance embodiment, each of the state information 211, 221 and 231 is managed by a corresponding instance 210, 220, and 230 of an application that is designed to manage message transactions of that particular message exchange pattern type. Accordingly, each of the instances 210, 220 and 230 are illustrated as being rectangular, to emphasize that they are instances of the same application.

Suppose also, that state information 241 and 251 correspond to different message transactions of the same message exchange pattern type, that is different than the message transaction type for instances 210, 220 and 230. In the per transaction instance embodiment, each of the state information 241 and 251 is managed by a corresponding instance 240 and 250 of an application that is designed to manage message transactions of the different transaction type. These instances 240 and 250 are illustrated as being triangular, to emphasize that they are instances of the same application, but a different application than the instances 210, 220 and 230.

In another embodiment referred to herein as "the multiple transaction instance embodiment", a single instance of an application may be able to simultaneously manage multiple message transactions of the same message exchange pattern type. In that case, state 211, 221 and potentially 231 would be managed by a single instance (e.g., instance 210) of an application, while state 241 and 242 would be managed by a single instance (e.g., instance 240) of another application.

In yet another embodiment referred to herein as "the multiple message exchange pattern instance embodiment", a single instance of an application may be able to simultaneously manage multiple message transactions of different message exchange pattern types. In that case, state 211, 221, 231, 241 and 251 may all be managed by a single instance (e.g., instance 210).

The principles of the present invention apply regardless of whether the per transaction instance embodiment, the multiple transaction instance embodiment, or the multiple message exchange pattern instance embodiment is in effect. However, the remainder of this description will focus on the per transaction instance embodiment as illustrated in FIG. 2.

The state information 211, 221, 231, 241 and 251 may include any state information useful in tracking progress through the associated message transaction. For example, state information 211 is illustrated as including corresponding data fields 212A, 212B, 212C, 212D and 212E amongst potentially many other data fields as represented by the vertical ellipses 212F. The data fields that are most important to the operation of the message transaction (e.g., data fields 212B, 212C and 212E) are marked with an asterix in its upper right corner. The state information also includes a redundancy data field 213 that includes redundancy information that may be used to perform consistency checking on the most important data fields in the state information 211. The redundancy data 213 may include Cyclic Redundancy Checking (CRC) data, hashing values, or any other redundancy data. A system consistency management module 201 operates to perform selective consistency checking in accordance with the principles of the present invention using the state information and redundancy data.

Figure 3:
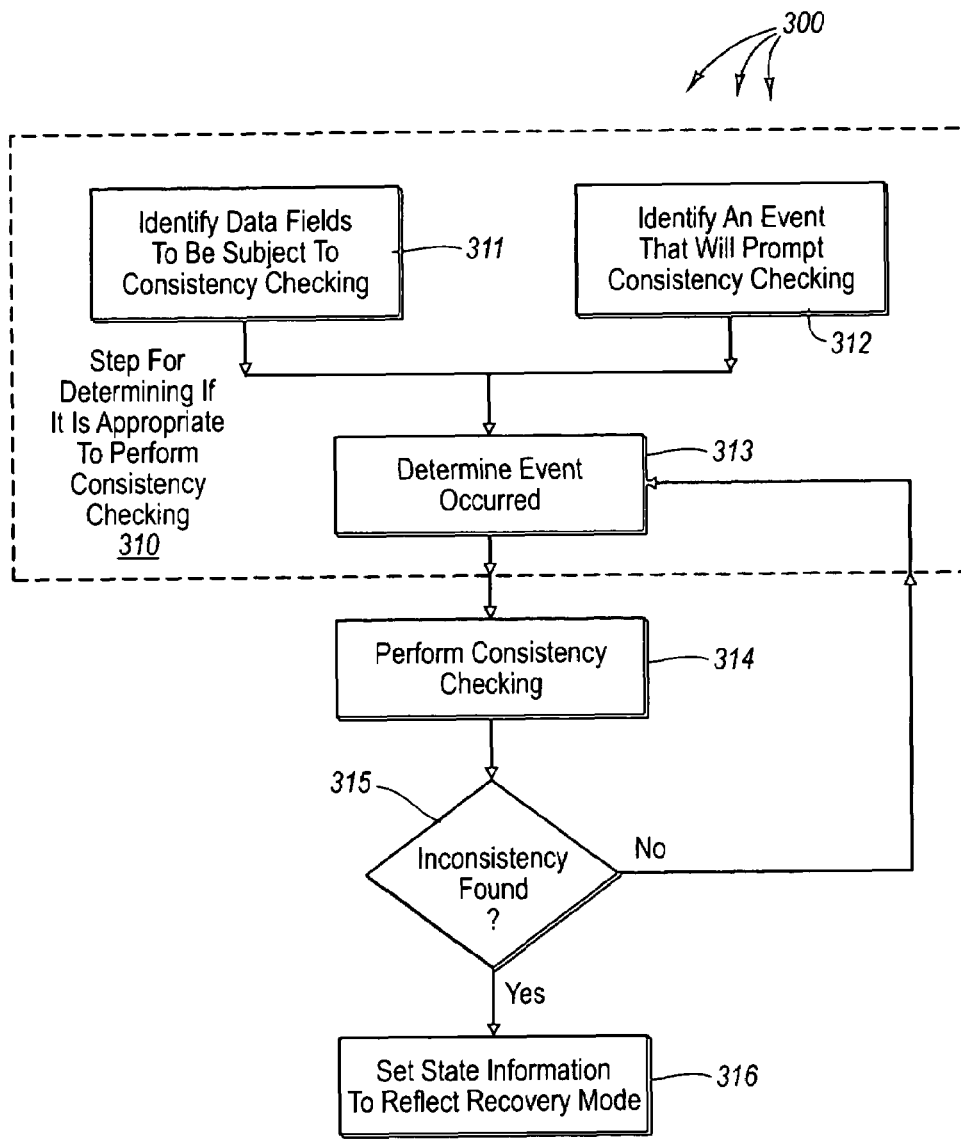
FIG. 3 illustrates a flowchart of a method for the system consistency management module to perform selective consistency checking.

FIG. 3 illustrates a flowchart of a method 300 for the system consistency management module 201 to perform selective consistency checking. The method 300 includes a functional, result-oriented step for determining that it is appropriate to perform consistency checking on a plurality of data fields in the state information (step 310). This may include any corresponding acts for accomplishing this result. However, in the illustrated embodiment, the step 310 includes corresponding acts 311, 312 and 313.

Specifically, the system consistency management module 201 identifies data fields of instance state information data fields that are to be subject to consistency checking (act 311). For example, referring to FIG. 2, the data fields 212B, 212C and 212E may be identified as to be subject to consistency checking. Note that the identified data fields represent less than all of the state information for the corresponding instance.

The system consistency checking management module 201 may identify the data fields on its own by evaluating the nature of the data field contents. Alternatively, the system consistency checking management module 201 may receive a function call at least implicitly identifying the data fields to be subject to consistency checking. The function call may be directly from the instance (e.g., instance 210) that manages the state information. Alternatively, the function call may be indirectly from the instance through one or more intermediary modules.

The system consistency checking management module 201 also identifies an event that will prompt the consistency checking to occur (act 312). Examples of such events may include the loading of the state information for the instance from persistent memory or other media persistent to system memory, saving of the state information for the instance to the persistent media, backing up of the state information, the occurrence of a specific time, and the passage of a specific amount of time since consistency checking was last performed. The event may also be the receipt of an express request to perform consistency checking from a component such as the instance.

Once again, the system consistency checking management module 201 may identify the event on its own. For example, the event may be an event specified by the programmer of the system consistency checking management module 201. Alternatively, the system consistency checking management module 201 may receive a function call at least implicitly identifying the event(s) that prompts the consistency checking. The function call may be directly from the instance (e.g., instance 210) that manages the state information. Alternatively, the function call may be indirectly from the instance through one or more intermediary modules.

Then, the system consistency checking management module 201 determines that the event occurred (act 313). In response, the consistency checking is performed on the identified data fields (act 314). The result of this consistency checking is that a determination is made as to whether or not the identified data fields have an inconsistency (decision block 315). The consistency may be evaluated by, for example, the system consistency checking management module 201 generates redundancy data (e.g., CRC data or hashing data) from the data fields 212B, 212C and 212E that are subject to consistency checking, and then compares the generated redundancy data with the store redundancy data 213. If a mismatch is found, then an inconsistency is likely or certainly present in the data fields 212B, 212C and/or 212E (the Yes branch in decision block 315). Otherwise, an inconsistency is likely not present (the No branch in decision block 315).

If there is no inconsistency (the No branch in decision block 315), the method returns to await the next event that triggers a consistency checking. In one embodiment, different events may trigger different consistency checking. The consistency checking may vary according to the type of redundancy data used (e.g., CRC data versus hashing data) and the type of consistency checking performed (e.g., CRC checking verses hashing checking). The consistency checking may also vary by the data fields to be subject to consistency checking. For example, when the state information is loaded into system memory, perhaps only some of the data fields are checked for consistency. Upon backing up the state information, however, perhaps all of the data fields are checked for consistency.

If an inconsistency is found (the Yes branch in decision block 315), the system consistency checking management module 201 may set the state information to reflect that the instance that manages the state information is in recovery mode (act 316). This recovery mode information may actually be part of the state information itself, and thus itself may be subject to consistency checking.

Figure 4:
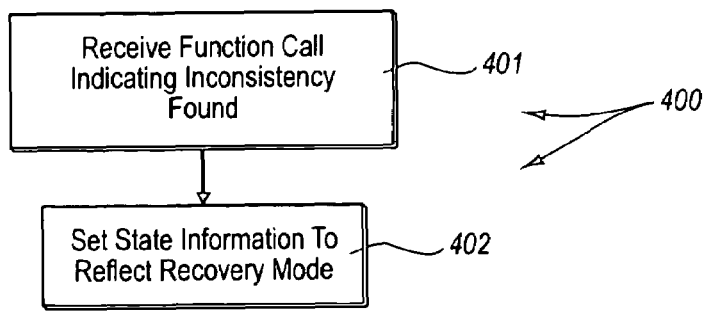
FIG. 4 illustrates a flowchart of a method for allowing an instance to control whether or not the system consistency management module performs consistency checking.

FIG. 4 illustrates a flowchart of a method 400 for allowing the instance (e.g., instance 210) to control whether or not the system consistency management module 201 performs consistency checking. The method 400 may be performed when the instance 210 is not to centralize consistency checking, but is to perform consistency checking itself. The method 400 may also be performed when the instance 210 is to perform consistency checking in addition to the consistency checking performed by the system consistency checking management module 201. In either case, the instance 210 may then perform consistency checking in the same manner as described above for the system consistency checking management module 201. Upon detecting an inconsistency, however, the instance 210 issues a function call indicating that an inconsistency is found.

This function call may be received directly by the system consistency checking management module 201, or indirectly through one or more intermediary modules (after potentially some restructuring of the function call). Either way, the system consistency checking management module 201 receives a function call using the API, the function call originating from the instance 210 (act 401). The function call at least implicitly indicates that the instance has found an inconsistency after checking a subset of all of the state information data fields corresponding to the instance. In response, the system consistency checking management module 201 sets the instance state information to reflect that the instance is in recovery mode (act 402).

Accordingly, the instance may have the system consistency management module identify the data fields that are to be checked and then have the system consistency management module perform the checking. The instance may elect to have a little more control by identifying the data fields to be checked to the system consistency management module and having the system consistency management module perform the checking. With even more control, the instance may perform the checking and just inform the system consistency management module when an inconsistency is detected. Therefore, the instance has wide ranging control over what component will perform consistency checking, when it will be performed, and what component will determine what data fields will be checked.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that includes one or more processors, and a system memory, wherein the computing system is capable of using the one or more processors to instantiate in the system memory an instance of an application program and a system consistency management module, a method for the system consistency management module to selectively performing consistency checking, the method comprising the following an act of selectively identifying a plurality of data fields of state information corresponding to the instance that are to be subject to consistency checking, the plurality of data fields representing less than all of the state information corresponding to the instance, and wherein the selective identification of the data fields to be consistency checked is performed by one of the application instance or by the consistency management module;

an act of selectively identifying an event that will prompt the consistency checking by one or more of the application instance or the consistency management module;

an act of the consistency management module determining that the prompting event has occurred; and in response to determining that the prompting event has occurred, an act of performing the consistency checking on the plurality of data fields of state information.

2. A method in accordance with claim 1, further comprising the following:

an act of determining that the plurality of data fields contains at least one inconsistency identified during the consistency checking performance; and in response to the determination that the plurality of data fields contains at least one inconsistency comprises an act of setting the state information of the instance to reflect that the instance is in recovery mode.

3. A method in accordance with claim 2, wherein the act of determining that the plurality of fields contains at least one inconsistency comprises the following:

an act of generating one or more cyclic redundancy checking values corresponding to the plurality of data fields;

an act of comparing the one or more generated cyclic redundancy checking values to one or more stored cyclic redundancy checking values corresponding to the plurality of data field; and an act of determining that there is at least one cyclic redundancy checking value that does not match.

4. A method in accordance with claim 1, wherein the act of identifying a plurality of data fields of state information corresponding to the instance that are to be subject to consistency checking comprises the following:

an act of receiving a function call using an Application Program Interface from the instance, the function call identifying at least implicitly the plurality of data fields.

5. A method in accordance with claim 4, wherein the act of receiving a function call using an Application Program Interface comprises the following:
    an act of receiving the function call via one or more intermediary modules.

6. A method in accordance with claim 5, wherein the act of receiving the function call via one or more intermediary modules comprises the following:
    an act of receiving the function call after some restructuring the function call to conform with the Application Program Interface.

7. A method in accordance with claim 4, wherein the act of identifying an event that will prompt the consistency checking comprises the following:
    an act of receiving a function call using the Application Program Interface from the instance, the function call identifying at least implicitly the event.

8. A method in accordance with claim 7, wherein the act of receiving a function call using an Application Program Interface comprises the following:
    an act of receiving the function call via one or more intermediary modules.

9. A method in accordance with claim 8, wherein the act of receiving the function call via one or more intermediary modules comprises the following:
    an act of receiving the function call after some restructuring the function call to conform with the Application Program Interface.

10. A method in accordance with claim 7, wherein the function call identifying the plurality of data fields and the function call identifying the event is the same function call.

11. A method in accordance with claim 1, wherein the act of identifying an event that will prompt the consistency checking comprises the following:
    an act of receiving a function call using the Application Program Interface from the instance, the function call identifying at least implicitly the event.

12. A method in accordance with claim 1, wherein the event is the loading of the state information for the instance from persistent media to system memory.

13. A method in accordance with claim 1, wherein the event is the saving of the state information for the instance to the persistent media.

14. A method in accordance with claim 1, wherein the event is the backing up of the state information.

15. A method in accordance with claim 1, wherein the event is the occurrence of a specific time.

16. A method in accordance with claim 1, wherein the event is the passage of a specific amount of time since consistency checking was last performed.

17. A computer program product comprising one or more computer-readable storage media storing computer-executable instructions for implementing the method recited in claim 1.

18. A computer program product in accordance with claim 17, wherein the one or more computer-readable media further have thereon computer-executable instructions that, when executed by the one or more processors, cause the computing system to further performing the following:
    an act of determining that the plurality of data fields contains at least one inconsistency identified during the consistency checking performance; and
    in response to the determination that the plurality of data fields contains at least one inconsistency comprises an act of setting the state information of the instance to reflect that the instance is in recovery mode.

19. A computer program product in accordance with claim 18, wherein the computer-executable instructions for performing the act of determining that the plurality of fields contains at least one inconsistency comprise computer-executable instructions for performing the following:
    an act of generating one or more cyclic redundancy checking values corresponding to the plurality of data fields;
    an act of comparing the one or more generated cyclic redundancy checking values to one or more stored cyclic redundancy checking values corresponding to the plurality of data field; and
    an act of determining that there is at least one cyclic redundancy checking value that does not match.

20. A computer program product in accordance with claim 17, wherein the computer-executable instructions for performing the act of identifying a plurality of data fields of state information corresponding to the instance that are to be subject to consistency checking comprise computer-executable instructions for performing the following:
    an act of receiving a function call using an Application Program Interface from the instance, the function call identifying at least implicitly the plurality of data fields.

21. A computer program product in accordance with claim 17, wherein the computer-executable instructions for performing the act of identifying an event that will prompt the consistency checking comprise computer-executable instructions for performing the following:
    an act of receiving a function call using the Application Program Interface from the instance, the function call identifying at least implicitly the event.

22. A computer program product in accordance with claim 17, wherein the one or more computer-readable media comprise physical memory media.

23. A computer program product in accordance with claim 22, wherein the physical memory media comprises persistent media.

24. A computer program product in accordance with claim 22, wherein the physical memory media comprises system memory.

25. In a computing system that includes one or more processors, and a system memory, wherein the computing system is capable of using the one or more processors to instantiate in the system memory an instance of an application program and a system consistency management module, a method for the system consistency management module to performing consistency checking as specified by the instance of the application program, the method comprising the following
    a step for determining that it is appropriate to perform consistency checking on a plurality of data fields, including:
        an act of selectively identifying a plurality of data fields of state information corresponding to the instance that are to be subject to consistency checking, the plurality of data fields representing less than all of the state information corresponding to the instance, and wherein the selective identification of the data fields to be consistency checked is performed by one of the application instance or by the consistency management module; and
        an act of selectively identifying an event that will prompt the consistency checking by one or more of the application instance or the consistency management module; and
    an act of performing the consistency checking on the plurality of data fields of state information.

26. A method in accordance with claim 25, wherein the step for determining that it is appropriate to perform consistency checking on a plurality of data fields further comprises the following:

an act of the consistency management module determining that the prompting event has occurred.

27. A method in accordance with claim 26, wherein the event is the loading of the state information for the instance from persistent media to system memory.

28. A method in accordance with claim 26, wherein the event is the saving of the state information for the instance to the persistent media.

29. A method in accordance with claim 26, wherein the event is the backing up of the state information.

30. A method in accordance with claim 26, wherein the event is the occurrence of a specific time.

31. A method in accordance with claim 26, wherein the event is the passage of a specific amount of time since consistency checking was last performed.

32. In a computing system that includes one or more processors, and a system memory, wherein the computing system is capable of using the one or more processors to instantiate in the system memory an instance of an application program and a system consistency management module, a method for the instance to control whether or not the system consistency management module performs consistency checking, the method comprising the following:

an act of receiving a function call using an Application Program Interface from the instance, the function call indicating that the instance has found an inconsistency in a selectively identified plurality of data fields, the identified data fields representing less than all of the state information corresponding to the instance; and in response to receiving the said function call, an act of setting the state information of the instance to reflect that the instance is in recovery mode.

33. A method in accordance with claim 32, wherein the function call is a first function call, the method further comprising the following:

an act of receiving a second function call using the Application Program Interface from the instance, the second function call requesting that the system consistency management module perform consistency checking on the plurality of data fields.

34. A method in accordance with claim 33, further comprising the following:

an act of identifying an event that will prompt the consistency checking;

an act of determining that the event has occurred; and in response to determining that the event has occurred, an act of performing the consistency checking on the plurality of data fields.

35. A computer program product of use in a computing system that includes one or more processors, and a system memory, wherein the computing system is capable of using the one or more processors to instantiate in the system memory an instance of an application program and a system consistency management module, the computer program product comprising one or more computer-readable storage media having thereon computer-executable instructions for performing a method for instance to control whether or not the system consistency management module performs consistency checking, the one or more computer-readable media having thereon computer-executable instructions that, when executed by the one or more processors, causes the system consistency management module to perform the method recited in claim 32.

36. A computer program product in accordance with claim 35, wherein the function call is a first function call, and the one or more computer-readable storage media further have thereon computer-executable instructions that, when executed by the one or more processors, causes the computing system to further perform the following:

an act of receiving a second function call using the Application Program Interface from the instance, the second function call requesting that the system consistency management module perform consistency checking on the plurality of data fields.

37. A computer program product in accordance with claim 35, wherein the one or more computer-readable storage media further have thereon computer-executable instructions that, when executed by the one or more processors, causes the computing system to further perform the following:

an act of identifying an event that will prompt the consistency checking;

an act of determining that the event has occurred; and in response to determining that the event has occurred, an act of performing the consistency checking on the plurality of data fields.

38. A computer program product in accordance with claim 35, wherein the one or more computer-readable storage media comprise physical memory media.

39. A computer program product in accordance with claim 38, wherein the physical memory media comprises persistent media.

40. A computer program product in accordance with claim 38, wherein the physical memory media comprises system memory.

* * * * *